United States Patent [19]

Götz

[11] 4,300,263
[45] Nov. 17, 1981

[54] PROCESS AND APPARATUS FOR THE PREPARATION OF FLAT-FISH FOR THE BLEEDING

[75] Inventor: Klaus Götz, Stockelsdorf, Fed. Rep. of Germany

[73] Assignee: Nordischer Maschinenbau Rud. Baader GmbH & Co. K.G., Lubeck, Fed. Rep. of Germany

[21] Appl. No.: 118,672

[22] Filed: Feb. 5, 1980

[30] Foreign Application Priority Data

Oct. 23, 1979 [DE] Fed. Rep. of Germany ....... 2942731
Dec. 7, 1979 [SE] Sweden ................. 7910095

[51] Int. Cl.³ .............................................. A22C 25/14
[52] U.S. Cl. ........................................... 17/45; 17/58
[58] Field of Search ................... 17/58, 51, 52, 61, 45, 17/59, 53; 99/547, 548

[56] References Cited

U.S. PATENT DOCUMENTS 1,853,328 4/1932 Youman ................................. 17/58
3,382,901 5/1968 Pheterson ............................ 99/547

FOREIGN PATENT DOCUMENTS 150306 2/1953 Australia ................................. 17/51
6909615 12/1970 Netherlands ............................. 17/58
1376624 12/1974 United Kingdom ..................... 17/53

Primary Examiner—Willie G. Abercrombie
Attorney, Agent, or Firm—Edward F. Levy

[57] ABSTRACT

The invention concerns a process for the mechanical opening of the bloodstream of flat-fish, the application of which has the aim of the bleeding of the fish. The apparatus proposed for this is equipped with a rotatably driven knife sleeve, which is sharpened at its end side and which is constructed to be lowered onto an aligned flat-fish lying flat therebeneath, and at its circumference carries tearing elements extending radially in the proximity of the cutting edge. The tool, penetrating into the abdominal cavity during lowering while separating circular area portions out of the oppositely disposed abdominal walls, tears open the bloodstream disposed at the underside of the spinal column by means of the radial tearing elements. Through a radially deviatable arrangement of the latter, there results an adaptation of the tool to the geometric conditions of the abdominal cavity as well as an enlarged radius of action through the rotation in consequence of centrifugal forces, which effects the tearing loose and comminution of the intestines. The feeding of rinsing liquid through the center of the tool into the abdominal cavity makes the flushing-out of belly contents possible.

12 Claims, 4 Drawing Figures

PROCESS AND APPARATUS FOR THE PREPARATION OF FLAT-FISH FOR THE BLEEDING

BACKGROUND OF THE INVENTION

1. Field of the Invention

The invention concerns a process and an apparatus for the opening of the bloodstream in unbeheaded flat-fish in the region of their abdominal cavities for the purpose of the bleeding.

2. Description of Prior Art

The blood-letting of freshly caught fish is a process which is prescribed by law in some countries, but basically is, however, of importance when it is desired to attain products of highest quality. To bring this effect fully to bear, it is necessary that the opening of the bloodstream take place immediately after the catching. This is usually achieved by an incision, which is conventionally performed by hand in the case of flat-fish, the incision being made from the belly side of the fish through the gill cavity up to the back bone. Such manual operation presents, on the one hand, the problem that sufficient personnel capacity must be present on board in order to be able to perform this operational step in the available time. On the other hand the fish suffers in its shape stability by such a cut, particularly since a precise cut application cannot be attained by manual means. Moreover, such manually-applied cut results in the difficulty that a mechanized further processing of the fish is made more difficult, if not impossible, because its exact alignment oriented at the outer contours, which is required for mechanical processing, it not possible. Because of these relationships, it has been attempted particularly in the case of flat-fish to attain the bleeding by opening the bloodstream through cutting the tail off. The result is, however, unsatisfactory with respect to the required bleeding time as well as to the degree of bleeding.

From the NL-OS 69 09 615, there is known an apparatus for the gutting of flat-fish, in which the abdominal cavity is opened from the side by means of a hack knife, the throat is severed and the intestines are subsequently sucked away through this incision by means of a suction nozzle. Apart from the fact that this equipment is not designed for the object of the opening of the bloodstream, it is also not suitable for this purpose, because such a function is assured with this cut application only when the flat-fish to be processed is so precisely aligned with respect to the tool that the bloodstream is tangent to the latter. It is open to question that this effect may perhaps result occasionally in the case of a particular fish; however, this known equipment is not usable for an intentional opening of the bloodstream because of the impossibility of such an exact alignment.

In the GB-PS 1 376 624, furthermore, a slaughtering machine is described, in which a tool is lowered from the side onto the flat-fish lying flat and being aligned with respect to their external outline, which tool is provided with stirring vanes, which enter one another in rolling motion and the points of which are constructed as knife blades and cut out the abdominal cavity wall, whereupon the intestines wind themselves around the stirring vanes and are torn out of the abdominal cavity. Here, too, the opening of the bloodstream is not mentioned as an object or intention and is also not to be made certain for the explained reasons.

OBJECT OF THE INVENTION

It is an essential object of the present invention to open by machine the bloodstream lying in the region of the abdominal cavity in the case of unbeheaded flat-fish for the purpose of the bleeding. It is a further and important object of the invention to make the removal of the intestines out of the abdominal cavity possible in the same operational step.

BRIEF SUMMARY OF THE INVENTION

According to the invention an area portion at least nearly tangent to the side line of the fish is separated by means of an incision out of the abdominal wall enclosing the abdominal cavity and the bloodstream is opened while comminuting the intestines and detaching them from their anchorings in the abdominal cavity by attack effective in the plane of the belly spokes and back spokes.

The advantages attainable thereby lie particularly in the fact that the structure and consistency of the fish, which is indispensible for the later beheading and filletting by machine, remains maintained and flesh free of bloodspots can be obtained by the bleeding. Beyond that, the possibility exists of the simultaneous cleaning of the abdominal cavity, which is of significance for the maintenance of the quality of the fish flesh, since the attack by bacteria and fermentation from the destroyed intestinal tract is inhibited thereby.

An apparatus advantageously suitable for the performance of the process is in known manner equipped with a support for the reception of the fish lying flat, means for its alignment and for the firm holding of the fish, and a cutting tool arranged above the support and is characterized in that the cutting tool is equipped with means for its raising and lowering and comprises a rotatably driven knife sleeve, which is sharpened at its end face facing the support and which at its circumference carries at least one tearing element extending radially in the proximity of the sharpened end face. Thus, a rather simple and practical construction is provided to perform the above process.

According to an advantageous embodiment of the invention, the tearing element is mounted to be radially resilient and provided with a prismatic or conical head. Thereby, the circulating path of the tearing element can on the one hand adapt itself to the geometry of the abdominal cavity, and it is on the other hand made possible thereby that the safe and reliable opening of the bloodstream succeeds in spite of a coarse alignment of the fish with respect to the cutting tool. At the same time, this construction enables the tearing element to dip through the belly lobes enclosing the abdominal cavity without damaging these belly lobes.

According to a further embodiment, the knife sleeve is provided with an axially displaceable hollow core, which is closed off at the end face facing the support and which is provided with radial passage openings in the proximity of the end face. Thereby, the passage therethrough of a rinsing liquid may be attained, which assures an intensive rinsing of the abdominal cavity.

By positioning the hollow core so that, in its rest position, its end face protrudes beyond the sharpened end face of the knife sleeve, provision is made for a covering of the sensitive cutting edge in the waiting position and for protection against damaging.

One or more spikes, which are arranged at the end face of the hollow core and protrude from it, effect the preliminary location of the fish during the lowering of the cutting tool onto the fish and before the cutting edge of the knife sleeve reaches the fish.

The preferred production of the cutting edge of the knife sleeve by bevelling of the latter or by providing it with a toothing favours the penetration of the ribs during the penetration of the cutting tool into the fish.

Expediently, the support may be provided with a recess or passage opening lying opposite the knife sleeve and of approximately the size of the knife sleeve. Thereby, the support forms a cutting counterbearing which makes possible the penetration of the full cross-section of the fish so that the intestines as well as the rinsing liquid can be carried away free of problems.

A coupling of the means for the raising and lowering of the cutting tool with the means for the aligning of the flat-fish makes possible a particularly simple construction of the apparatus.

In order to improve the gutting action and the processing of fish of soft consistency, the circumferential speed of the knife sleeve is increased for a short time after the lowering of the cutting tool.

BRIEF DESCRIPTION OF THE DRAWINGS

Other and further objects of the present invention will be apparent form the following description and claims and are illustrated in the accompanying drawings, which, by way of illustration, show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing form the present invention and the scope of the appended claims.

In the drawings

DETAILED DESCRIPTION OF THE PREFERRED EMBODIMENT

Figure 1:
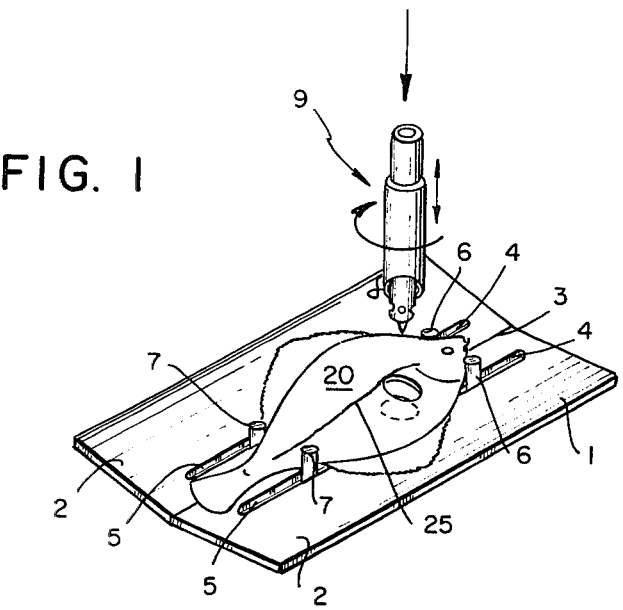
FIG. 1 shows an overall view of the working field of an apparatus according to the invention in axonometric illustration.

Arranged in a frame (not shown) of an apparatus for the preparation of flat-fish for the bleeding is a support 1 for flat-fish 20, which support is advantageously constructed as a trough consisting of two surfaces 2 inclined to each other. Symmetrically with and substantially parallel to the central junction line 3, i.e. in both surfaces 2, slot-like passage openings 4 and 5 are arranged, through which protrude upstanding centering pins 6 and 7, forming part of a centering device which is not illustrated in detail. The respective pairs of centering pins 6 and 7 are each interconnected beneath the support 1 by conventional coupling elements (not shown) and are thus synchronously movable in the passage openings 4 and 5. The support 1 in the region between the slot-like passage openings 4 and 5 has a further recess or passage opening 8 of cylindrical structure, which touches the lowest line 3. Disposed above the support 1 is a lowerable cutting tool 9, which consists of a knife sleeve 10, which is journalled to be rotatable about an axis 11 aligned with the axis of the recess 8 and the end of which facing the support 1 is bevelled and constructed as cutting edge 12. Fastened to the knife sleeve 10 in the proximity of its cutting edge 12 are a plurality of tearing elements 13, which comprise leaf springs 14, which extend tangentially in a direction opposite to the rotational direction of the knife sleeve 10, nestle against the knife sleeve 10 and which each at their free end carry a prismatic head 15. Disposed in the interior of the knife sleeve 10 and concentrically with its axis 11 is a hollow core 16, which is closed at its downwardly facing end face 17 and which is constructed to be retractable into the knife sleeve 10 against the force of a spring (not shown), thereby exposing the cutting edge 12. A series of radial passages or bores 19, which communicate with an axial bore passing through the hollow core 16, are arranged in the proximity of the end face 17 of the hollow core 16. The end face 17 is provided with a spike 18 projecting centrally therefrom.

Figure 2:
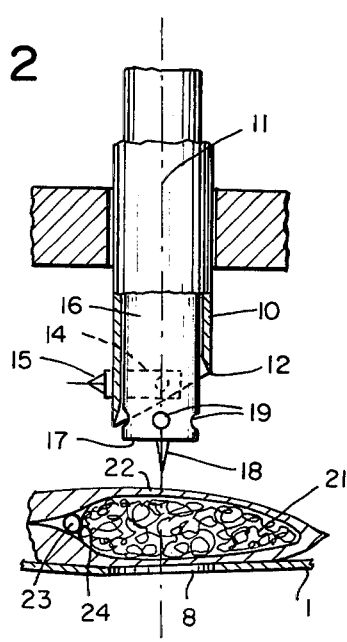
FIG. 2 illustrates a longitudinal cross-section through the cutting tool in its rest position.
Figure 3:
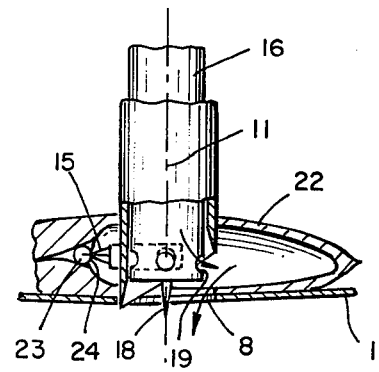
FIG. 3 shows a longitudinal cross-section through the cutting tool in its operative position and FIG. 4 shows a transverse cross-section through the cutting tool in the plane of the tearing elements.
Figure 4:
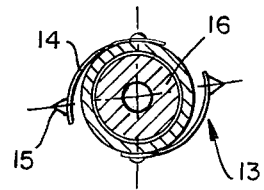

The function of the apparatus is as follows:

A flat-fish 20 to be processed is as illustrated in FIG. 1 brought onto the support 1 after the centering pins 6 and 7 of the centering device have been set in a selected spaced-apart position by moving them from below the surfaces 2 of the support 1. By activation of the centering device, the centering pins 6 and 7, while penetrating the slot-like passage openings 4 and 5, are moved towards each other in pairs, whereby the flat-fish 20, which has been inexactly pre-aligned with respect to its longitudinal axis by means of the trough-shaped construction of the support 1, is seized in its head and tail region at both sides of its longitudinal axis and then fixed in its longitudinal position. In this position, the side line 25 (FIG. 1) and the abdominal cavity 21 (FIG. 2) of the flat-fish are disposed under the rotatably driven cutting tool 9, which is then lowered. During this downward movement, the spike 18 protruding out of the end face 17 of the hollow core 16 at first impinges on the abdominal wall 22 enclosing the abdominal cavity 21 so that an additional location of the flat-fish 20 takes place. By reason of the resilient mounting of the hollow core 16, the latter retracts into the interior of the knife sleeve 10 in the course of the further lowering of the cutting tool 9, as shown in FIG. 3, so that the cutting edge 12 of the knife sleeve 10 can become effective. This edge now opens the abdominal cavity and penetrates into the latter by cutting a circular area portion out of the abdominal wall. In the course of such cutting, the tearing elements 13, which circulate on a diameter which is greater than the diameter of the area portion, in consequence of their helical motion due to the advance of the cutting tool 9 and the soft consistency of the abdominal wall penetrate the latter without damage. The advance is terminated when the tearing elements 13 have approximately reached the plane of the belly and back spokes. In this position, the cutting edge 12 has already penetrated the oppositely disposed lower abdominal wall and likewise cut an area portion out of this, while it has entered into the recess 8. By reason of their elastic arrangement, the tearing elements 13 can on the one hand, obeying the centrifugal force, describe an an enlarged rotary wiping path of circulation and on the other hand adapt their circulatory path to the geometry of the abdominal cavity. This geometry is in part determined by the backbone or vertebral column 23, along the underside of which the tearing elements 13 scrape. In this instance, the bloodstream 24 nestling against this side of the backbone is opened by means of the prismatic heads 15. At the same time, the tearing elements 13 effect a comminution and detachment of the intestines so that these can flow away downwardly. This process can be promoted by feeding a rinsing liquid through the central bore of the hollow core 16, whereby passage of the liquid through the radial bores 19 effects an intensive rinsing effect in the abdominal cavity. In the lowered position of the knife sleeve 10, shown in FIG. 3, the hollow core 16 is caught by an inner abutment so that the rinsing plane in this position remains in the abdominal cavity.

To enable the gutting process to proceed simultaneously with the opening of the bloodstream, the circumferential speed of the knife sleeve 10 can be increased in its lowered position. Thereby, it is assured that even fish of very soft consistency can be processed without the abdominal wall 22 being damaged on the entry of the tearing elements 13, because the centrifugal forces effective on them in this phase can be kept small. The course of the individual operating phases of the apparatus can take place completely automatically, wherein the insertion of the flat-fish by means of a suitable control device can trigger the start of this course.

For the sake of simplicity the means for the lowering and lifting and for the drive of the cutting tool 9 have not been illustrated in detail but only schematically by arrows because they merely comprise conventional constructional elements. The same applies to the means for moving the centering pins 6 and 7. The drive means for the cutting tool 9 and for the centering device 6, 7 may also be connected or coupled with each other by conventional elements in order to achieve a constant operation of the apparatus.

What is claimed is:

1. A process for mechanically opening the bloodstream of unbeheaded flat-fish in the region of their abdominal cavities for the purpose of bleeding comprising the steps of:

separating from said fish an area portion substantially tangential to the side line of the fish by means of a cutting stroke in a first plane through the abdominal wall enclosing the abdominal cavity, and performing a circular tearing stroke in a second plane substantially perpendicular to said first plane in alignment with the belly spokes and back spokes of the fish, for opening the bloodstream, comminuting the intestines and detaching the latter from their anchorings in the abdominal cavity.

2. A process for mechanically opening the bloodstream of unbeheaded flat fish in the region of their abdominal cavities for the purpose of bleeding, comprising the steps of:

lowering onto the flat side of the fish a rotating cutting tool comprising a knife sleeve having a sharpened end face and at least one tearing element extending radially from the circumference of said knife sleeve, in a direction to cause said sharpened end face to cut a circular incision through the abdominal wall enclosing the abdominal cavity of the fish, lowering the rotating cutting tool further within the body of the fish to a lowermost position in which said tearing element is located within the abdominal cavity in transverse alignment with the bloodstream adjacent the backbone of the fish, and continuing rotation of said cutting tool in said lowermost position at a sufficient speed to cause the free end of said tearing element to move rapidly in a circular path spaced from the circumference of said knife sleeve and having a radius sufficient to cause said tearing element to engage said bloodstream in a tearing action.

3. A process according to claim 2 in which said tearing element is mounted on said knife sleeve for radial movement outwardly of the circumference of said knife sleeve by centrifugal action, and in which the circumferential speed of the rotating knife sleeve is increased for a selected period when said cutting tool reaches its lowermost position.

4. Apparatus for opening the bloodstream of unbeheaded flat-fish in the region of their belly cavities for the purpose of bleeding comprising:

a rotary cutting tool, a support member mounted beneath said cutting tool for receiving a flat-fish and supporting the latter in a flat condition thereon, positioning means for aligning said fish immovably upon said support member with the belly cavity of said fish in registry with said cutting tool, said cutting tool comprising a rotatably-driven knife sleeve having a sharpened end face facing said support, and at least one tearing element extending radially from said knife sleeve in the vicinity of said sharpened end face, said tearing element having at its free end a terminal tearing portion extending perpendicularly to the longitudinal axis of said knife sleeve, said knife sleeve being movable between an elevated position in which its sharpened end face and said tearing element are spaced above the fish on said support member, and a lowered position in which the sharpened end face of said rotatably-driven knife sleeve has cut through said fish and said tearing element is located within the fish belly cavity in alignment with said bloodstream therein in a transverse plane substantially perpendicular to the axis of said knife sleeve, whereby upon continued rotation of said knife sleeve, said tearing element moves in a circular path along said transverse plane with said terminal tearing portion performing a circular tearing action on said bloodstream to open the latter.

5. Apparatus according to claim 4 in which said tearing element is mounted for movement on said knife sleeve between a retracted position in which said tearing portion is located proximate to the circumference of said knife sleeve and an extended position in which said tearing portion is spaced outwardly from the circumference of said knife sleeve.

6. Apparatus according to claim 5 in which said tearing element is disposed in its retracted position during initial cutting of said knife sleeve through said fish, and is moved to its extended position when said knife sleeve reaches its lowered position and continues to rotate.

7. Apparatus according to claim 4, wherein said tearing element is mounted to be radially resilient and provided with one of a prismatic and conical head.

8. Apparatus according to claim 4, wherein said knife sleeve is provided with an axially displaceable hollow core which is closed at its end face facing said support and which communicates with radial passage openings adjacent said end face.

9. Apparatus according to claim 8, wherein said hollow core in its rest position protrudes by its end face beyond the sharpened end face of said knife sleeve.

10. Apparatus according to claim 8 or 9, wherein at least one spike projects axially from the end face of said hollow core.

11. Apparatus according to claim 4, wherein said knife sleeve is bevelled in the region of its sharpened end face.

12. Apparatus according to claim 4, wherein said support member is provided with a recess in alignment with said knife sleeve and of approximately the size of said knife sleeve.

* * * * *